United States Patent [19]

Hoeksema

[11] Patent Number: 4,572,694
[45] Date of Patent: Feb. 25, 1986

[54] STRUCTURE MEMBER CONNECTOR

[75] Inventor: Ari H. Hoeksema, Edmonton, Canada

[73] Assignee: Otto Fastening Systems Ltd., Edmonton, Canada

[21] Appl. No.: 632,950

[22] Filed: Jul. 20, 1984

[51] Int. Cl.⁴ .................... F16B 7/08; F16L 41/08
[52] U.S. Cl. ................... 403/187; 403/255; 403/405.1
[58] Field of Search ........... 403/255, 254, 253, 199, 403/194, 196, 230, 231, 187, 248, 406, 405

[56] References Cited

U.S. PATENT DOCUMENTS

| | | | |
|---|---|---|---|
| 3,669,479 | 6/1972 | Payne | 403/231 |
| 3,811,785 | 5/1974 | Hagglund | 403/231 |
| 4,207,014 | 6/1980 | Worrallo | 403/406 |

FOREIGN PATENT DOCUMENTS

| | | | |
|---|---|---|---|
| 919379 | 1/1973 | Canada . | |
| 1123570 | 5/1982 | Canada . | |
| 2298721 | 8/1976 | France | 403/230 |
| 4714527 | 1/1968 | Japan | 403/230 |
| 1421371 | 1/1976 | United Kingdom | 403/230 |

Primary Examiner—Cornelius J. Husar
Assistant Examiner—Peter M. Cuomo
Attorney, Agent, or Firm—Sim & McBurney

[57] ABSTRACT

A connector system for interconnecting members used in forming various types of framing structures is disclosed. The connector is insertable in the hollow portion of the first member and when actuated, interconnects the two members together. One of the members has a slotted wall portion provided with opposing ledges. The connector, as secured in the second member, engages the ledges when actuated to snugly secure one member to the other. The connector is actuated by a cam inserted through an opening in the wall of the second member, such that when turned to a second position, engages the wall to force the connector further inwardly of the second member to draw together and snugly secure the two members. This type of connector is particularly useful in interconnecting frame members used in forming office partition walls, display panels and the like. The connector is releasable to allow dismantling and reuse of the connectors and the structural members thereby providing portability of the system.

15 Claims, 7 Drawing Figures

STRUCTURE MEMBER CONNECTOR

FIELD OF THE INVENTION

This invention relates to connectors for interconnecting structural members.

BACKGROUND OF THE INVENTION

A variety of connectors are available for interconnecting structural members, particularly those formed of aluminum extrusion and used in forming structural arrays for exhibit panels and the like commonly used at product exhibitions. Examples of such connectors are disclosed in Canadian Pat. Nos. 919,379 and 1,123,570. Each patent is directed to inserting a connector within the hollow portion of one member, engaging the connector with the second member and drawing the connector inwardly of the hollow member to complete the connection. In each patent, the manner in which the connector is drawn into the tubular member is by the use of a screw having a tapered end which engages a sloping recess in the connector. The screw, when fully turned in, causes by way of engagement of the sloping surfaces a movement of the connector within the member to secure the connection. Although this system is operable, it requires precise machining of the components rather than forming the components by standard extrusion techniques.

SUMMARY OF THE INVENTION

A connector system, according to an aspect of the invention, interconnects first and second structural members. The first member has a slotted wall portion provided with opposing ledges which define a slot opening. The second member has an open interior with an open end for connection to the first member along the slotted wall. The second member has at least one wall with an opening therein. The second member end has means for abutting the ledges of the first member.

The connector has a pair of spaced-apart arms interconnected at their first ends by a base and having at each extremity of the arms means for engaging a corresponding ledge of the first member with the arms extending through the slotted wall and essentially the remainder of the connector position within the hollow second member.

A cam extends through the opening and between the arms adjacent the connector base. The cam engages an operative edge portion of the wall opening which is located a predetermined distance from the abutment means of the second member end. The cam is configured whereby the cam in a first position, as it engages the operative edge portion of the opening, locates the pair of engaging means for loosely engaging the corresponding ledges of the first member. The cam, when rotated to a second position as it engages the operative edge portion of the wall opening, draws the ledges by the engaging means against the abutment means of the second member by forcing the connector base away from the operative edge portion of the opening.

The predetermined position of the operative edge portion of the opening is determined by the spatial relationship of the connector base to the connector engaging means and to the cam in the second position. Means is provided for stabilizing the cam in the second position to secure snugly thereby the interconnection of the first and second members.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
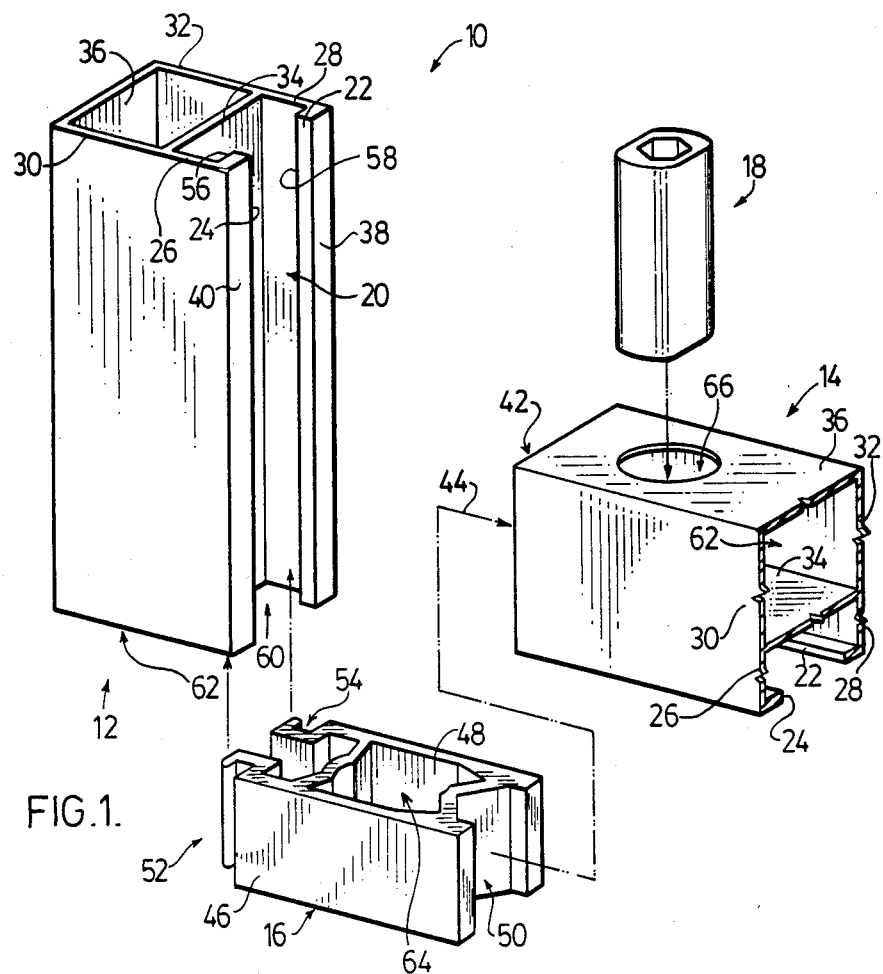
FIG. 1 is an exploded view of the connector system according to this invention.

The connector system 10, as shown in FIG. 1 according to this preferred embodiment, comprises a first member 12 to be interconnected to a second member 14 by a connector 16 which is actuated by a cam 18. The first member 12 has a slotted wall 20 defined by inwardly projecting ledges 22 and 24. The ledges are integral with side walls 26 and 28. These side walls 26 and 28 are extensions of the same side walls forming opposing wall portions 30 and 32 of the rectangular hollow portion of the member 12. The remaining set of walls 34 and 36 complete the hollow rectangular-shaped portion. The slotted wall 20 includes faces 38 and 40 which are abutted by the end 42 of the second member 14.

According to this preferred embodiment, the second member 14 is of identical cross-section as indicated by like numerals. The end portion 42 is planar and is perpendicular to the longitudinal axis of the hollow rectangular structure, as indicated by arrow 44. Thus the planar end portions of walls 30, 32, 34 and 36 abut the faces 38 and 40 of the ledges of the first member when the members are interconnected.

The connector 16 comprises arms 46 and 48 which are interconnected at one end by a base 50. At the extremity of the other end of each arm is an arrangement 52 and 54 for engaging the internal faces 56 and 58 of the first member. To assemble the system of FIG. 1, the connector 16 has its engagement devices 52 and 54 slid into the channel 60 in the direction of arrows 62. Thus the arms 46 and 48 extend through the slotted wall and essentially the remainder of the connector 16 is then inserted into the hollow rectangular portion 62 through the open end 42 of the second member. The cavity 64 defined above the base 50 between the arms 46 and 48 is generally aligned with an opening 66 formed in the wall 36 of the second member. The cam 18 is inserted into the cavity 64 of the connector and thereby extends between the arms 46 and 48 of the connector and also through the opening 66.

Figure 2:
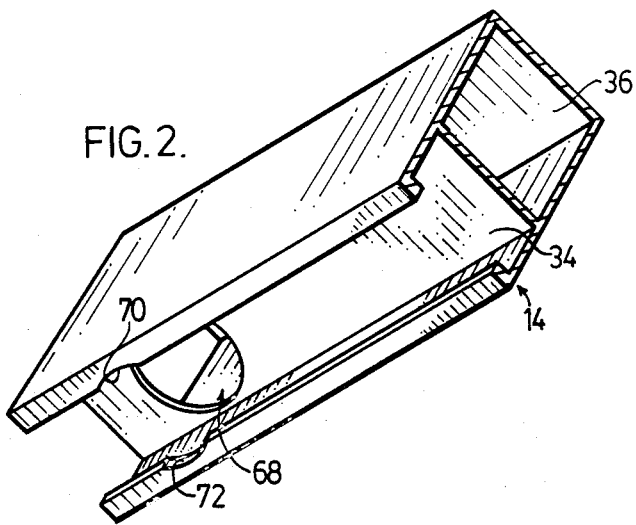
FIG. 2 is a perspective view of one of the members used in the connection system of FIG. 1.

As shown in FIG. 2, the second member 14 may have an aligned opening 68 provided in wall 34 opposite the opening in wall 36. This provides stability for the cam 18 as it thus extends through openings 66 and 68 and between the arms 46 and 48 of the connector 16. In forming the opening 68 in wall 34, it may or may not be necessary to recess the ledge portions in the area 70 and 72 by way of a drill or the like.

Figures 3, 4:
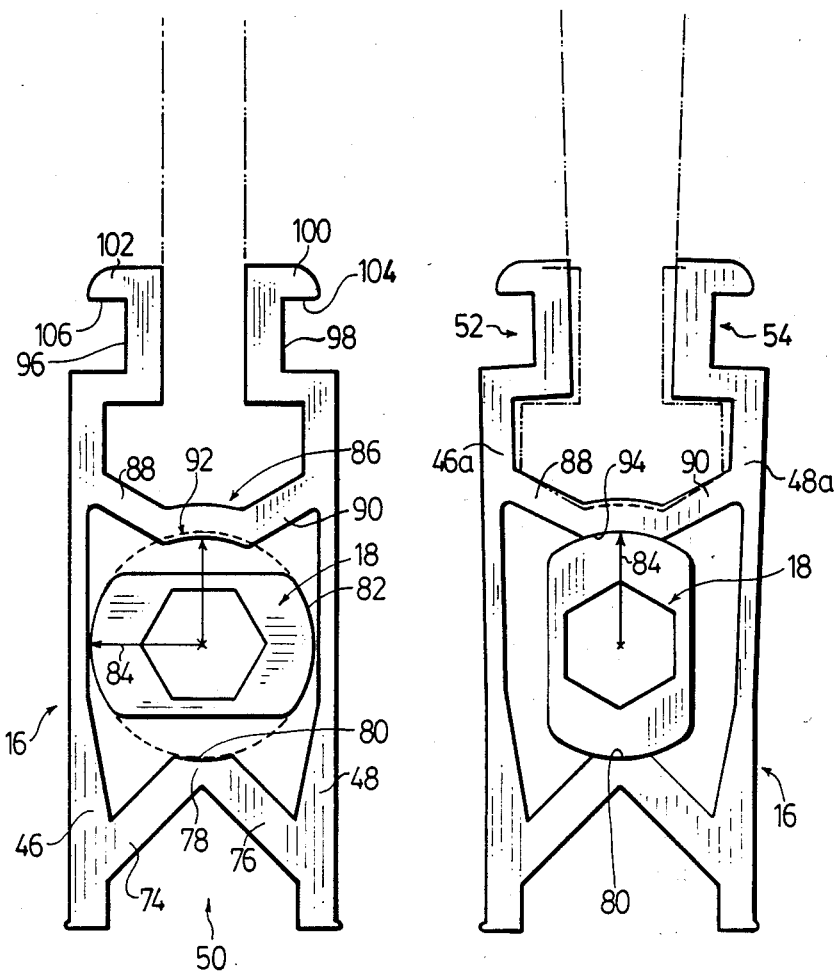
FIG. 3 is a side view of the connector with the cam in a first position.
FIG. 4 is a side view of the connector of FIG. 3 with the cam rotated to its second position.

The connector 16, as shown in FIG. 3, has the base 50 formed by inwardly and upwardly extending legs 74 and 76 which are integral with the arms 46 and 48. The thickness of the arms in the lower region adjacent the base are considerably thicker than the upper portions to provide support when the cam is used to activate the connector in securing the members. The legs 74 and 76 intersect in the region of apex 78 which is truncated or rounded at 80 so as to engage the circular surface 82 of the cam 18. The distance between the side walls 46 and 48 of the connector are slightly greater than the greatest dimension of the major axis of the cam 18 as indicated by arrow 84.

The upper portion of the connector 16 includes a cross member 86 which, according to a preferred embodiment, is used in stabilizing the cam 18 in the connector when moved to the second position as shown in FIG. 4. The cross member 86 includes two inwardly and downwardly extending legs 88 and 90 which intersect at an apex portion 92 having recessed circular face 94 for engagement with the circular portion 82 of the cam 18. With the cam 18 in its first position indicated by its minor axis, there is sufficient space between the rounded portions 82 of the cam and the side walls 46 and 48. When the cam 18 is rotated to the second position as shown in FIG. 4, which according to this embodiment involves rotation of 90°, the major axis 84 now extends in the direction of the connector. The diameter between the circular surfaces 82 of the cam 18 is greater than the diametrical distance between rounded apex portions 80 and 94. The legs 88 and 90 of the cross member 86 are thinner and, therefore, weaker than the base legs 74 and 76. As the connector 18 is rotated to the second position, the legs 88 and 90 are flexed from their original position, as shown in dot in FIG. 4, to the solid position to in turn move the arms outwardly as indicated by their new positions 46a and 48a. This in turn spreads the arms at their extremities 52 and 54 to assist in snugly interconnecting the structural members in the manner to be discussed with respect to FIGS. 5 and 7.

At the extremity of each arm, the engagement devices are adapted to fit behind and engage the inner surfaces 56 and 58 of the ledge portions. The arms are, therefore, stepped at their extremities to define recesses 96 and 98 and outwardly extending flanges 100 and 102. Each flange has an inner face 104 and 106 for engaging the corresponding inner faces 56 and 58 of the ledges of the first member.

Figure 5:
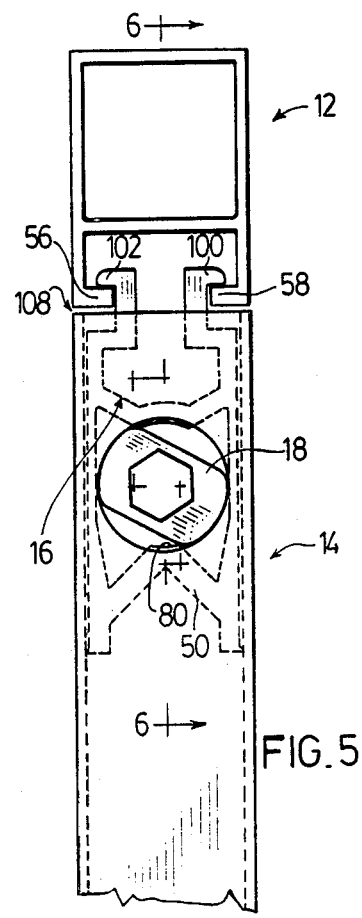
FIG. 5 is a side view of the connector system of FIG. 1 loosely connected.
Figure 6:
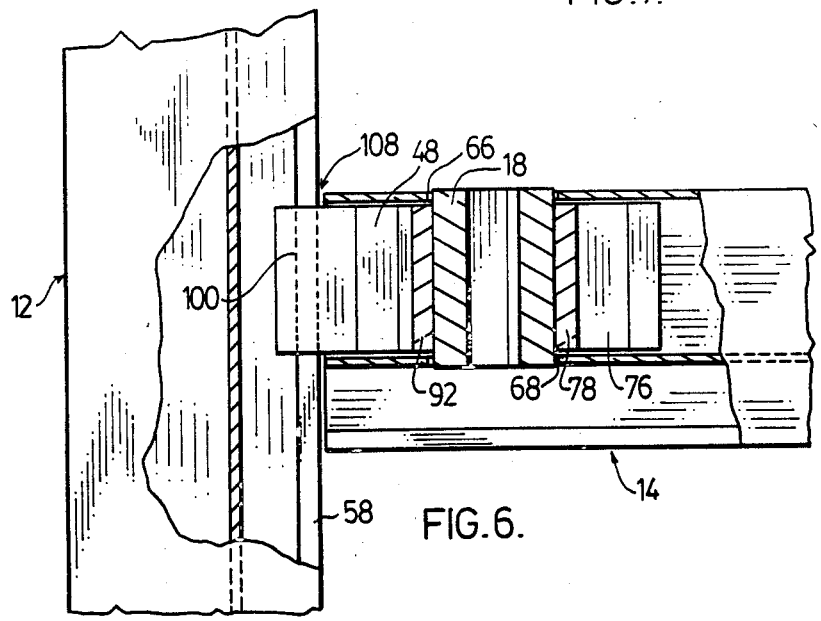
FIG. 6 is a section along the line 6—6 of FIG. 5.

Turning to FIG. 5, the system of FIG. 1 is assembled with the connector 16 inserted into the hollow portion of the second member in the manner shown in the section of FIG. 6. As demonstrated by the gap at 108, the first member 12 is loosely connected to the second member 14. The flanges 100 and 102 are spaced behind the respective ledges 56 and 58 of the first member. This loose interconnection is determined by the cam 18 as it abuts the apex portion 80 of the base 50.

Figure 7:
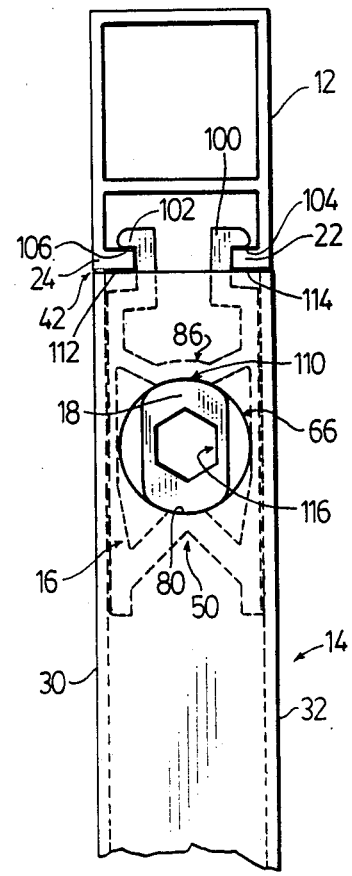
FIG. 7 is a side view of the connector system of FIG. 1 snugly interconnected.

When it is desired to secure the connection as shown in FIG. 7, the cam 18 is rotated to the second position as discussed with respect to FIG. 4. Because the cam 18 projects through the aperture 66, the cam 18 engages the operative edge portion 110 of the opening 66 in forcing the connector 16 further within the tubular portion of the second member 14, by engaging the base 50. The operative edge portion 110 of the openings 66 is located in a predetermined manner relative to the end 42 of member 14. This location is predetermined by the spatial relationship of the base apex 80 relative to the diametrical distances between the curved portions 82 of the cam and the distance from the apex 80 to the underside 104, 106 of the flanges 100 and 102. By rotating the cam 18 to the second position as shown in FIG. 7, the cam engages the operative edge portion 110 of the opening 66 and in turn pushes the base 50 away from the end 42 of the member 14. This draws the first member 12 towards the second member 14 so that the planar edges 112 and 114 of the walls of the second member abut the faces 38 and 40 of the ledges to form a secure interconnection. It is appreciated that a corresponding operative edge portion may be provided for opening 68 as shown in FIG. 2. Its position would be predetermined in the same manner as the position of portion 110 is determined.

According to a preferred embodiment of the invention, simultaneously with the drawing together of the connection by rotating the cam to the second position, the cross member 86 has its legs flexed to spread the arms outwardly and firmly seat the recessed portions 96 and 98, as shown in FIG. 3, against the edges of the ledges 22 and 24 to resist tortional movement between the two members. The dimensioning between the walls 30 and 32 may be such to loosely receive the connector when the cam is in the first position, but when rotated to the second position, spreads the arms to abut the interior of the opposing walls 30 and 32 and further enhance the snug interconnection of the two members, as clearly demonstrated by the absence of space between the ledges 22, 24 and the planar face 42 of the second member.

The cam 18 may be formed with an irregular shaped opening 116 which may be either in the form of a recess or extend completely through the cam. The irregular shaped opening may be in the form of a hexagon to permit the use of an Allen key to facilitate the manual rotation of the cam 18 from the first position, as shown in FIG. 5, to the second position as shown in FIG. 7.

It is appreciated that only one opening 66 need be provided in the wall of the second member in order for the connector to function, providing there is within the connector or on some other part of the member 14 a device for stabilizing the cam in the second position. Conveniently, this can be accomplished by the cross member 86 which binds the cam between the apex faces 80 and 92 of the connector. The operative edge portion 110 of the opening 66 provides the abutment which determines the extent to which the first and second members are drawn together in forming the secure connection.

It is further appreciated that the members, the connector and the cam can be formed from extrusion of aluminum alloys. It is also appreciated that plastic materials may be used to accomplish the same function. It is also appreciated that a variety of sections for the first and second members may be used providing in the first member there is the slotted wall portion and in the second member, the opening provided in at least one wall to enable the connector to function. Should the second member be circular, it is appreciated that interiorly of the first member other faces are provided to stabilize the connector in use.

Although various preferred embodiments of the invention have been described herein in detail, it will be understood by those skilled in the art that variations may be made thereto without departing the spirit of the invention or the scope of the appended claims.

The embodiments of the invention in which an exclusive property or privilege is claimed are defined as follows:

1. A connector system for interconnecting first and second members, said first member having a slotted wall portion provided with opposing ledges which define a slot opening, said second member having an open interior with an open end for connection to said first member along said slotted wall, said second member has opposing walls with openings therein, said second member end having abutment means for abutting said ledges of said first member, a connector having a pair of spaced-apart arms interconnected at their first ends by a base and having at each extremity of the arms means for engaging a corresponding ledge of said first member with said arms extending through said slotted wall and the remainder of said connector positioned within said hollow second member, a cam extending through said openings and between said arms adjacent said connector base, said cam engaging an operative edge portion of said wall openings, said cam being configured whereby said cam in a first position as it engages said operative edge portion of said openings locates said pair of engaging means for loosely engaging said corresponding ledges of said first member and said cam when rotated to a second position as it engages said operative edge portion of said wall openings draws said ledges against said abutment means of said second member by forcing said connector base away from said operative edge portion of said openings with said engaging means engaged with said ledges, a predetermined distance of said operative edge portion being determined by the spatial relationship of said connector base to said connector engaging means and to said cam in said second position, means for stabilizing said cam in said second position to secure snugly thereby the interconnection of said first and second members, said cam having an elongate body portion which is oblong in cross-section and having major and minor axes, said cam as it extends between said connector arms projects through said openings which are automatically aligned by being positioned said predetermined distance from said second member end, said oblong cross-section of said cam providing said first position with said minor axis extending in the same direction as the longitudinal axis of said second member and providing said second position with said major axis extending in the same direction as the longitudinal axis of said second member.

2. A connector system of claim 1, wherein said stabilizing means comprises means for frictionally binding said cam in said second position.

3. A connector system of claim 2, wherein said frictional binding means is provided on said connector.

4. A connector system of claim 3, wherein said frictional binding means comprises a cross member between said arms and spaced apart from base to bind said cam between said cross member and base when said cam is in said second position.

5. A connector system of claim 2, wherein said second member comprises opposing walls with said opening in each wall, said openings in said opposing walls being aligned, said cam extending through both openings as it extends between said arms of said connector, said frictional binding means comprises said operative edge portion of each opening as they bind said cam in said second position between said operative edge portions and said connector base.

6. A connector system of claim 1, wherein said second member end is planar thereby providing said abutment means.

7. A connector system of claim 1, wherein the plane of said second member end is perpendicular to the longitudinal axis of said second member to form a right angle interconnection between said first and second members.

8. A connector system of claim 7, wherein said second member is hollow rectangular in cross-section member, at least two opposing end walls of said second member forming said abutment means.

9. A connector system of claim 1, wherein said connector arms are essentially parallel and spaced apart slightly less than the width between the remaining set of opposing walls of said hollow rectangular second member, each said arm has a flange projecting outwardly for engaging said corresponding ledge of said first member.

10. A connector system of claim 9, wherein said connector base comprises intersecting substantially rigid legs extending inwardly and upwardly from said arms to define an apex which contacts said cam, a cross member integral with said arms is spaced above said base apex, the spacing between said cross member and said base apex being such to bind said cam therebetween when said cam is in said second position.

11. A connector system of claim 10, wherein said cross member is less rigid than said base, said cross member comprising inwardly and downwardly extending legs which intersect at a second apex position opposite said base apex, said leg of said cross member flexing to spread said arms apart when said cam is moved to said second position to force said arms against said ledges.

12. A connector system of claim 11, wherein said cross member and said operative edge portions of said aligned openings form said stabilizing means for said cam.

13. A connector system of claim 12, wherein said first and second members are identical in cross-section, each member having a rectangular in cross-section hollow portion with two sets of opposing walls, one set of walls extending equally beyond a wall of the other set to define a channel for each member, each wall extension of the channel having said inwardly extending ledge to define said slotted wall of the first member, the set of walls without the extensions having said openings formed therein to provide said second member.

14. A connector system of claim 13, wherein said first and second members, said connector and said cam are formed from extrusions of aluminum alloy.

15. A connector system of claim 14, wherein said cam has an aperture extending therethrough which is irregular in section to permit the use of tool inserted in said aperture for facilitating manual rotation of said cam from said first position to said second position.

* * * * *